US008281050B2

(12) United States Patent
Otani et al.

(10) Patent No.: US 8,281,050 B2
(45) Date of Patent: Oct. 2, 2012

(54) METHOD AND APPARATUS OF STORAGE ARRAY WITH FRAME FORWARDING CAPABILITY

(75) Inventors: Toshio Otani, Sunnyvale, CA (US); Gary John Pilafas, Hoffman Estates, IL (US)

(73) Assignees: Hitachi, Ltd., Tokyo (JP); Hitachi Data Systems Corporation, Santa Clara, CA (US)

( * ) Notice: Subject to any disclaimer, the term of this patent is extended or adjusted under 35 U.S.C. 154(b) by 1 day.

(21) Appl. No.: 12/860,303

(22) Filed: Aug. 20, 2010

(65) Prior Publication Data

US 2012/0047293 A1    Feb. 23, 2012

(51) Int. Cl.
*G06F 3/00* (2006.01)
*G06F 13/00* (2006.01)

(52) U.S. Cl. .............. 710/29; 710/33; 710/36; 709/213; 711/111

(58) Field of Classification Search .............. 710/29–39; 709/213–216; 711/111–112
See application file for complete search history.

(56) References Cited

U.S. PATENT DOCUMENTS

| | | | | |
|---|---|---|---|---|
| 5,991,797 A * | 11/1999 | Futral et al. | ............... | 709/216 |
| 5,991,813 A * | 11/1999 | Zarrow | ............... | 709/236 |
| 6,115,747 A * | 9/2000 | Billings et al. | ............... | 709/231 |
| 6,757,778 B1 * | 6/2004 | van Rietschote | ............... | 711/6 |
| 6,874,060 B2 * | 3/2005 | Blood et al. | ............... | 711/111 |
| 6,965,911 B1 * | 11/2005 | Coffman et al. | ............... | 709/201 |
| 7,216,264 B1 * | 5/2007 | Glade et al. | ............... | 714/48 |
| 7,266,637 B1 * | 9/2007 | van Rietschote | ............... | 711/112 |
| 7,565,487 B2 * | 7/2009 | Taguchi et al. | ............... | 711/114 |
| 7,600,092 B2 * | 10/2009 | Yamamoto et al. | ............... | 711/170 |
| 7,711,789 B1 * | 5/2010 | Jnagal et al. | ............... | 709/213 |
| 7,853,830 B2 * | 12/2010 | Crawley | ............... | 714/42 |
| 7,925,802 B2 * | 4/2011 | Lauterbach et al. | ............... | 710/38 |
| 8,020,168 B2 * | 9/2011 | Hoover et al. | ............... | 718/107 |

OTHER PUBLICATIONS

Ko et al., "Virtual Ethernet Bridging", IBM, http://www.ieee802.org/1/files/public/docs2008/new-dcb-ko-VEB-0708.pdf; 2008.
Ganga et al., "Virtual Ethernet Bridging in Server end stations", IEEE 802.1 interim meeting, Sep. 16, 2008, Seoul, Korea.
Wikipedia, "Storage area network"; http://en.wikipedia.org/wiki/Storage_area_network; Jul. 8, 2010.

* cited by examiner

*Primary Examiner* — Christopher B Shin
(74) *Attorney, Agent, or Firm* — Mattingly & Malur, PC

(57) ABSTRACT

Embodiments of the invention provide a method of storage array with frame forwarding capability to reduce the complexity of an IT platform system having a large number of hardware devices. In one embodiment, a storage system comprises one or more storage devices; a storage controller having a storage controller processor and a storage controller memory and being coupled with the one or more storage devices; an interface controller receiving an input/output command directly from a host computer; and an internal bus. The interface controller and the storage controller are coupled by the internal bus. In another embodiment, a storage system comprises one or more storage devices; a storage controller having a processor and a memory and being coupled with the one or more storage devices; and a network interface controller which provides virtual Ethernet bridging.

20 Claims, 16 Drawing Sheets

System Configuration

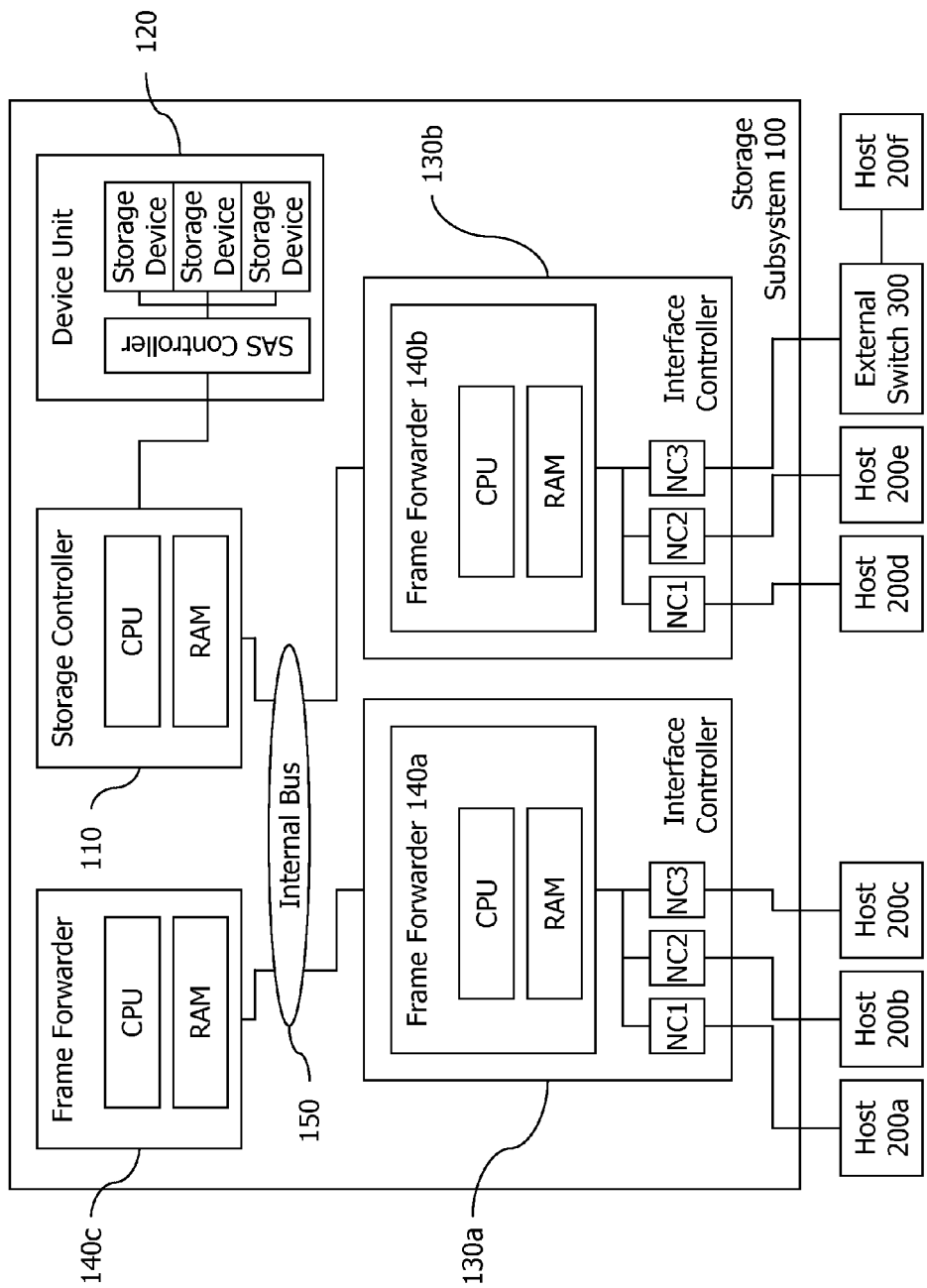
Fig.1 System Configuration

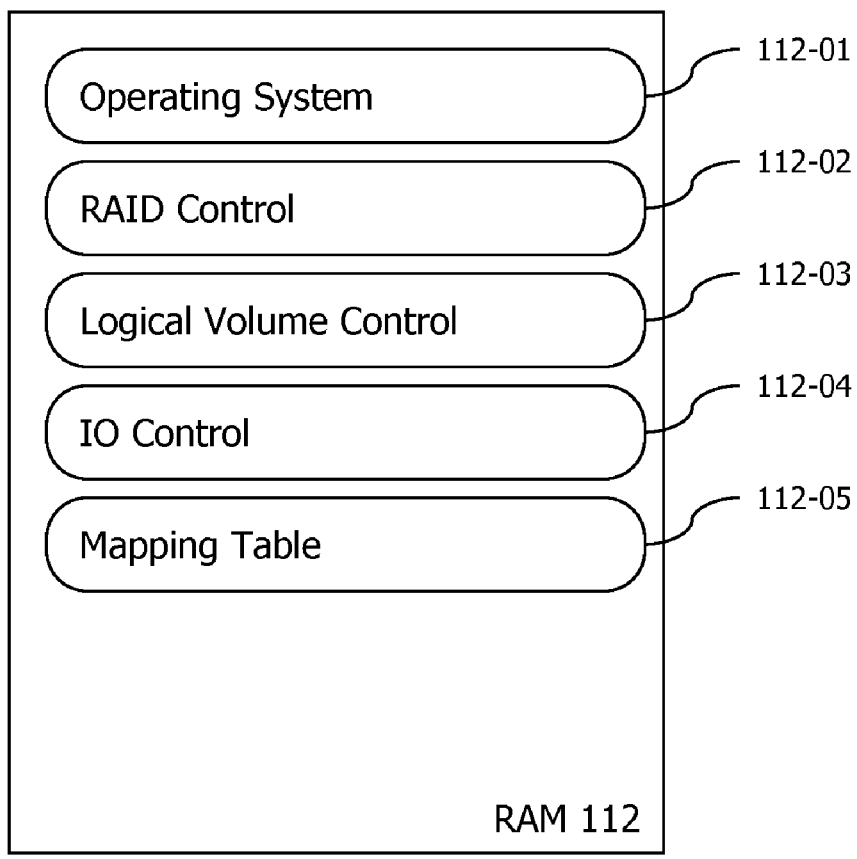
Fig.2 Software Configuration – Storage Controller

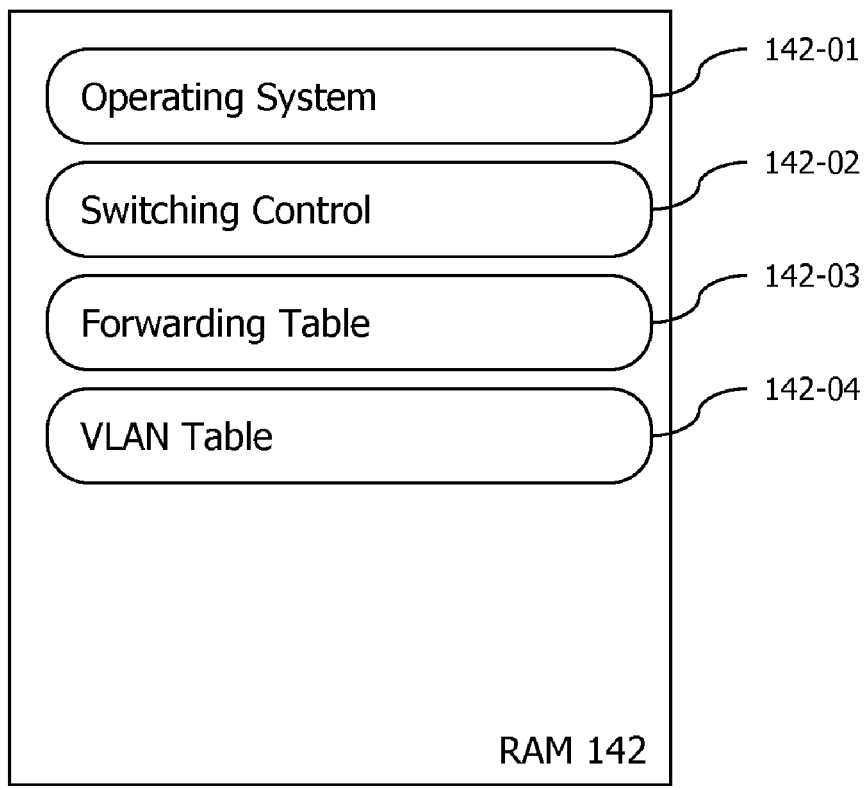
Fig.3 Software Configuration – Frame Forwarder

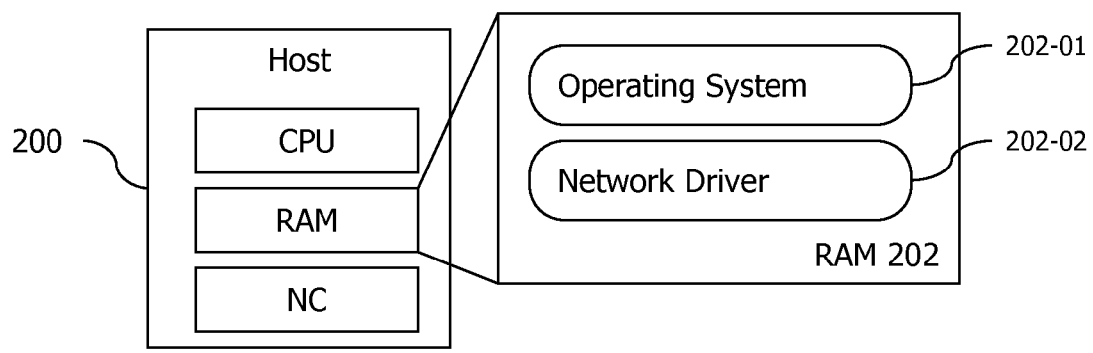
Fig.4 System Configuration - Host

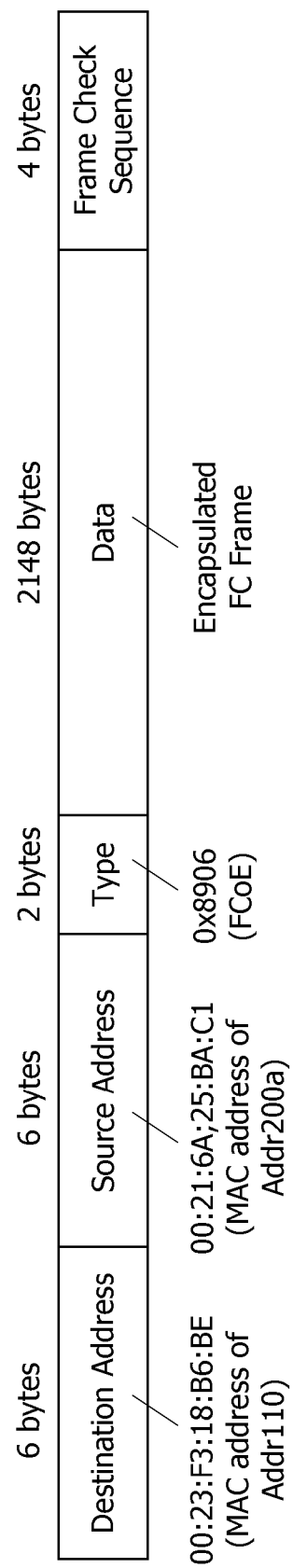
Fig.5a Example of Frame Format (Storage I/O: FCoE)

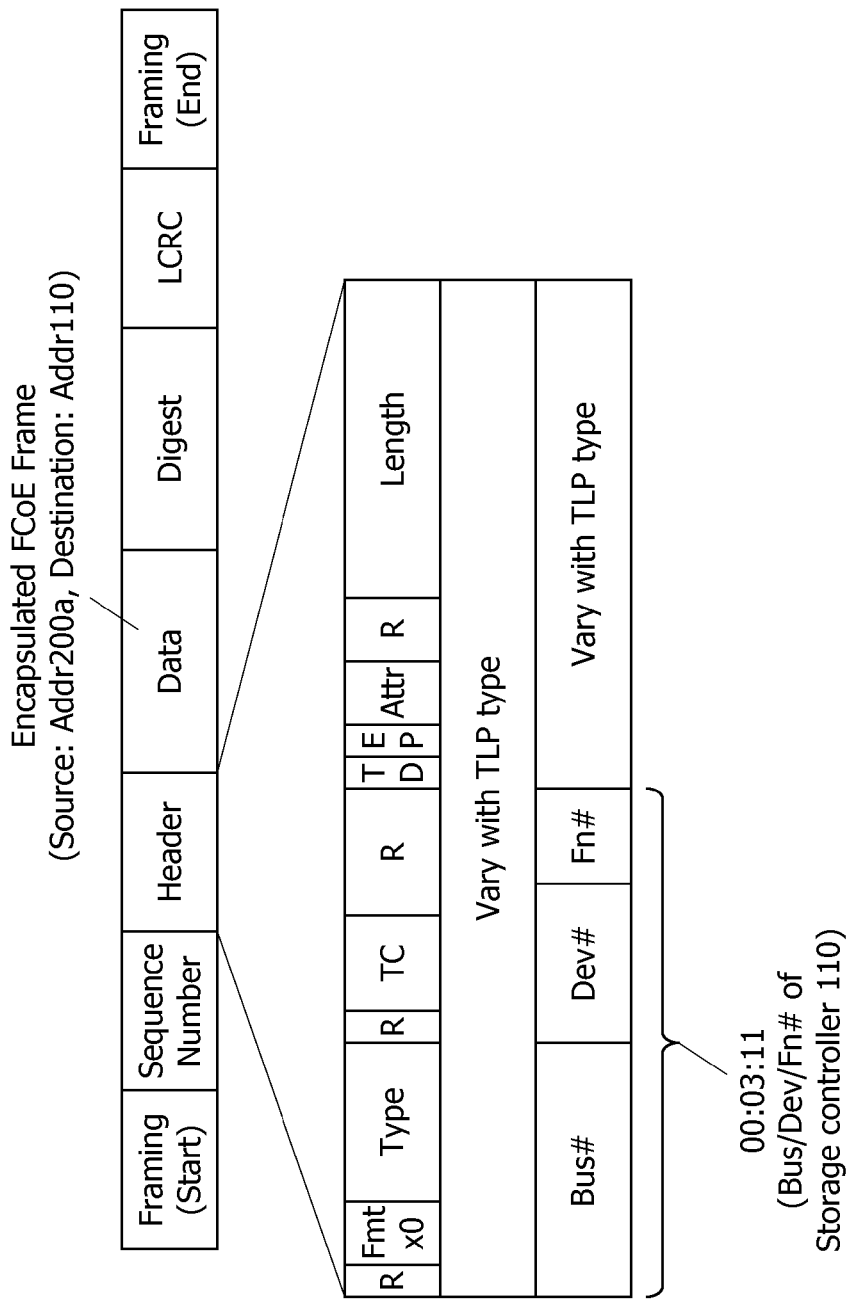
Fig.5b Example of Frame Format (Storage I/O: FCoE over PCI express)

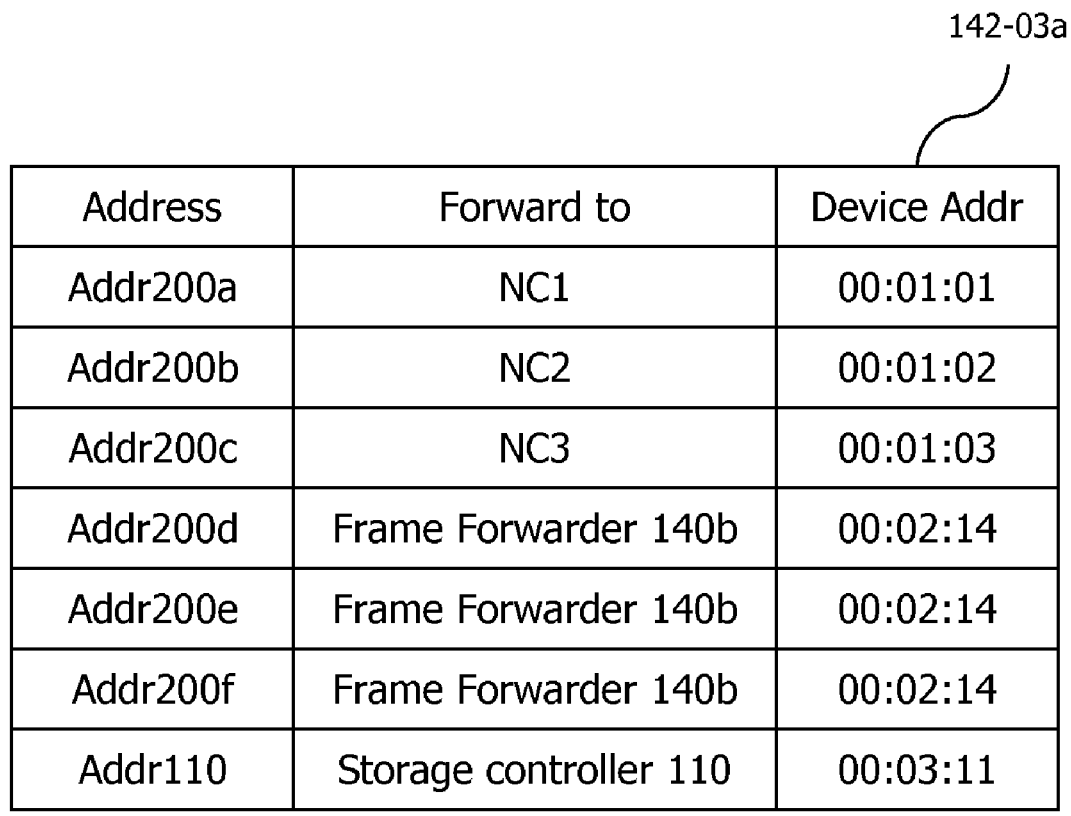
Fig.6a Example of Forwarding Table (140a)

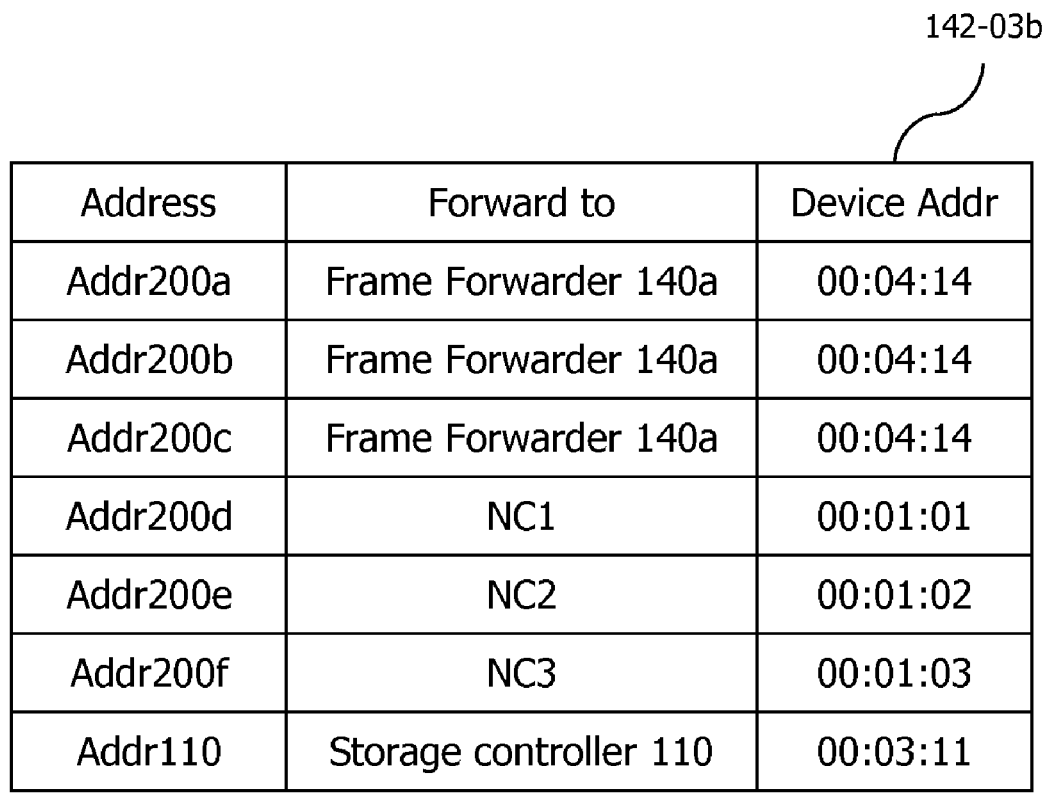
Fig.6b Example of Forwarding Table (140b)

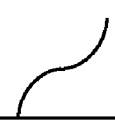
Fig.6c Example of Forwarding Table (140c)

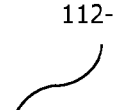
Fig.7 Example of Mapping Table on Storage Controller 110

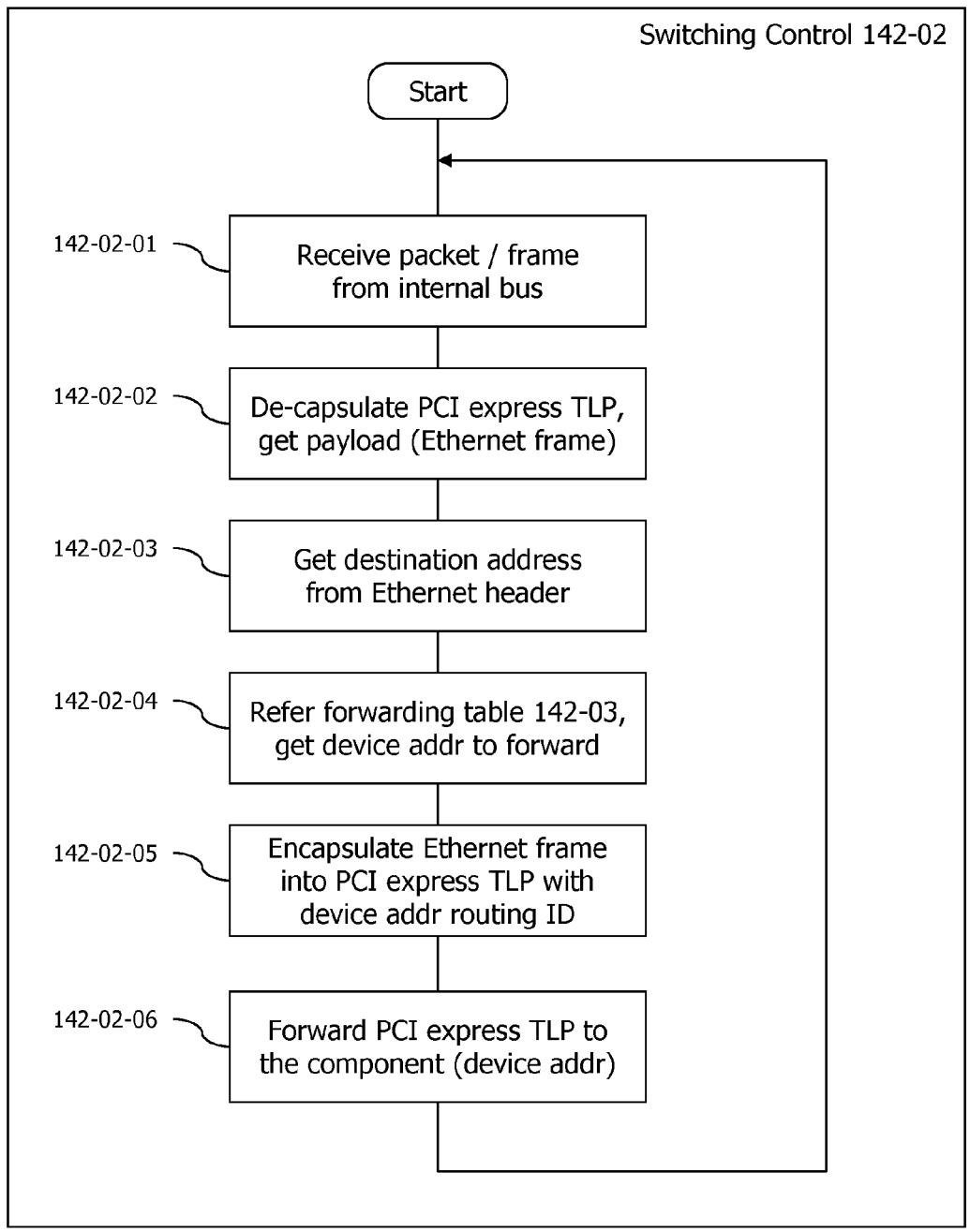
Fig.8 Flow chart of frame forwarder 140

| 6 bytes | 6 bytes | 2 bytes | 46-1500 bytes | 4 bytes |
|---|---|---|---|---|
| Destination Address | Source Address | Type | Data | Frame Check Sequence |
| 00:21:B6:83:6C:E3 (MAC address of Addr200d) | 00:21:6A;25:BA:C1 (MAC address of Addr200a) | 0x0800 (IP) | Encapsulated TCP/IP Packet | |

Fig.9a Example of Frame Format (Host I/O: TCP/IP)

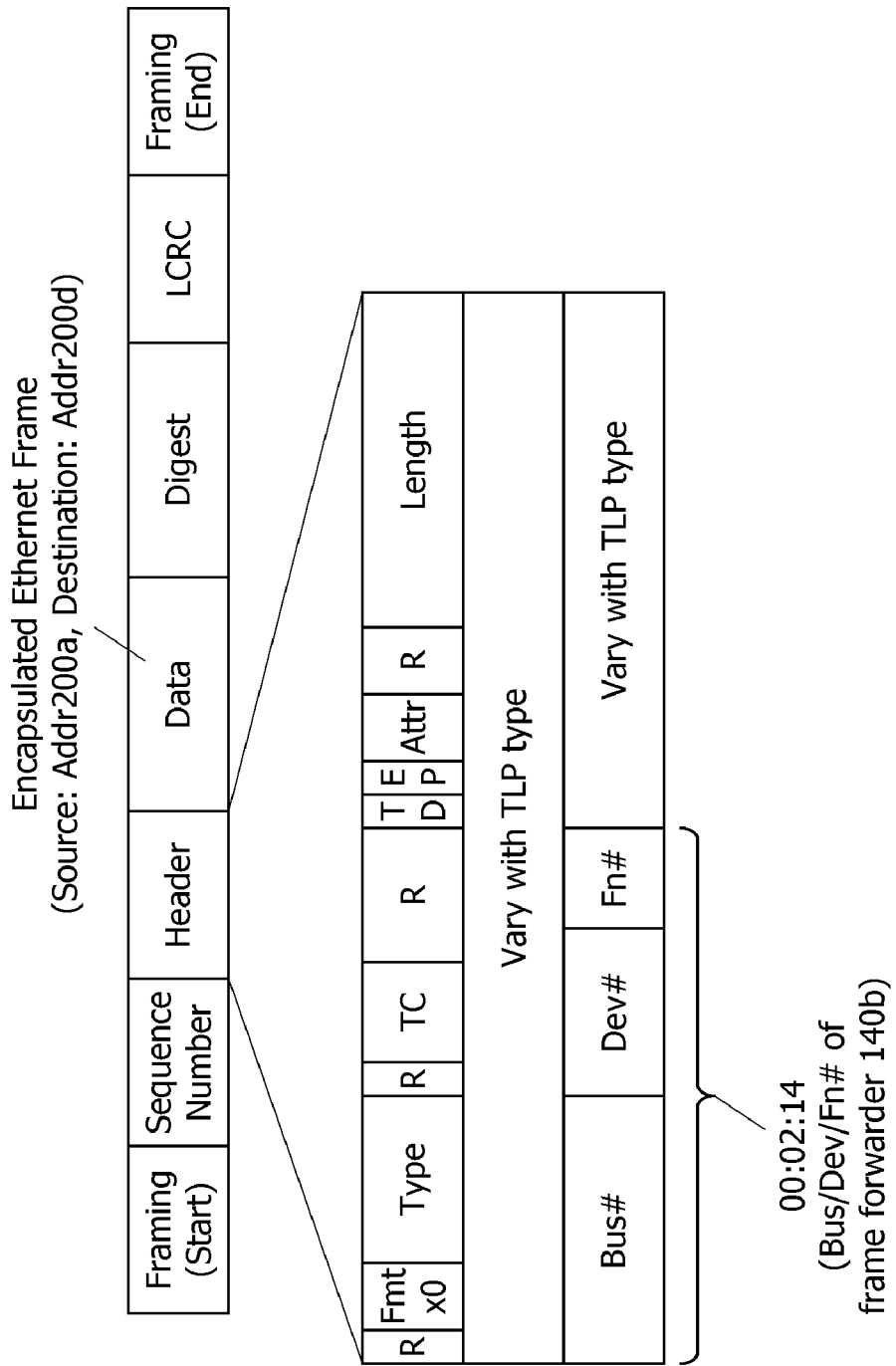
Fig.9b Example of Frame Format (Host I/O: Ethernet over PCI express)

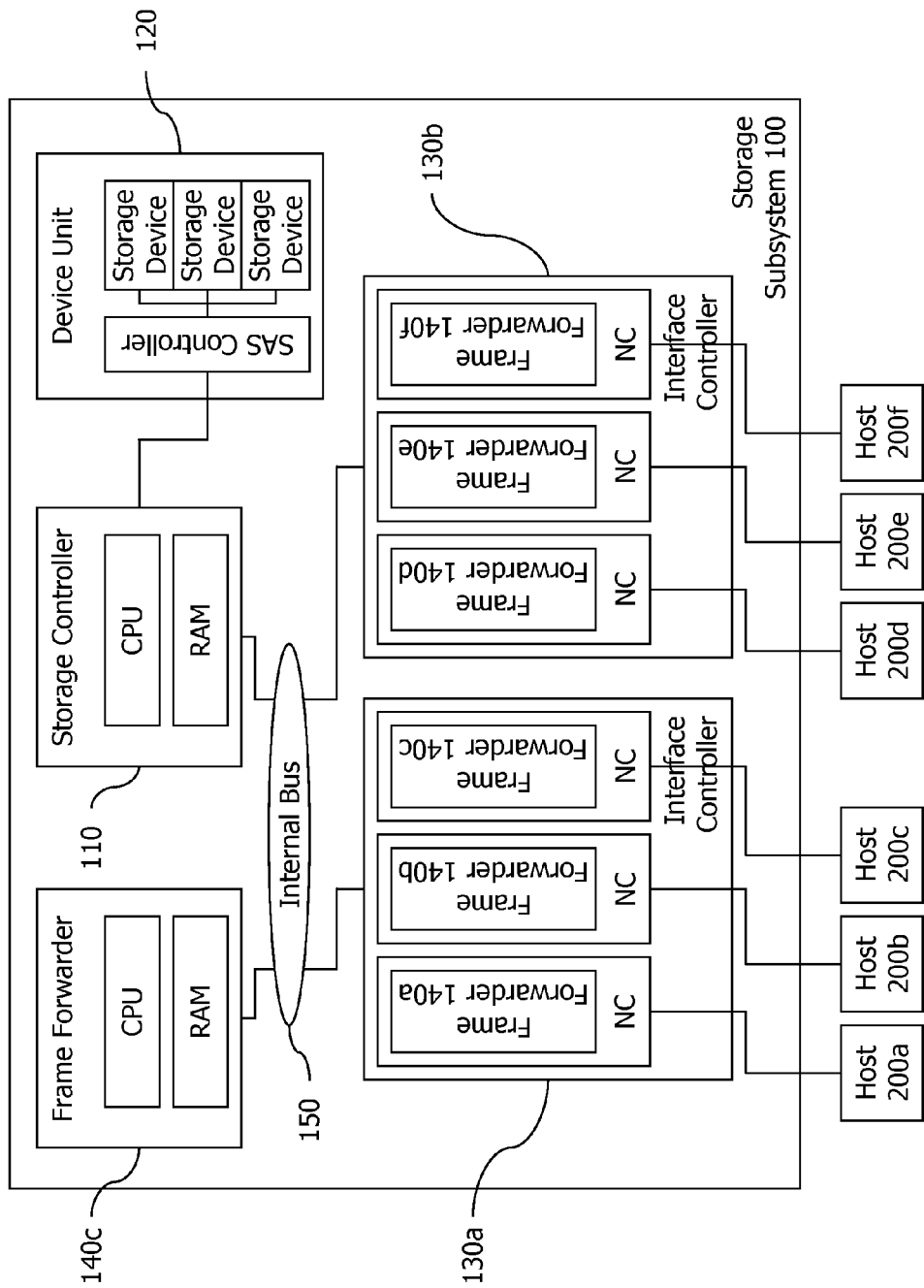
Fig.10 System Configuration 142-04a

| VLAN ID | Network Controller |
|---|---|
| 100 | NC1 |
| 100 | NC2 |
| 200 | NC3 |

142-04b

| VLAN ID | Network Controller |
|---|---|
| 100 | NC1 |
| 200 | NC2 |
| 200 | NC3 |

Fig.11 Example of VLAN Table 142-04

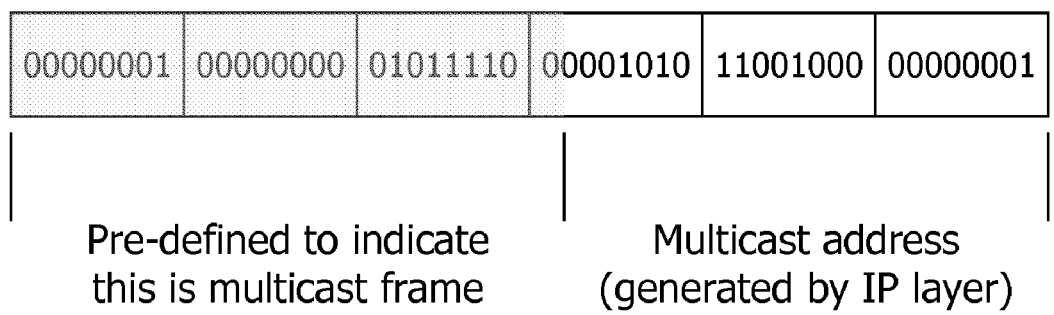
Fig.12 Example of Multicast Frame

METHOD AND APPARATUS OF STORAGE ARRAY WITH FRAME FORWARDING CAPABILITY

BACKGROUND OF THE INVENTION

The present invention relates generally to storage systems and, more particularly to a method of storage array with frame forwarding capability to reduce the complexity of an IT (Information Technology) platform system having a large number of hardware devices.

An IT platform system has plural hardware devices such as one or more server machines, networking switches, and storage subsystems. Typically, an IT platform system has a server machine such as an x86 server or a UNIX server; a networking switch such as an Ethernet switch, an IP router, or an FC switch; and a storage subsystem such as a shared SAN (Storage Area Network) storage subsystem or a NAS (Network Attached Storage) subsystem. In order to provide the required computing resources to business applications such as email, ERP, database, or the like, the IT platform system must be designed and deployed properly by a highly trained IT system designer.

Recently, the IT platform system has become very complex. High demands of computing resources from business applications make IT platform systems increasingly bigger. As a result, the IT platform system needs more and more hardware devices. Even a highly trained IT system designer finds it very difficult to design and deploy a huge IT platform system properly. One of the problems is that the IT system designer has to know the various hardware devices such as x86 server, UNIX server; Ethernet switch, IP router, FC switch; SAN storage subsystem, NAS, and so on. As the number and complexity of these hardware devices increase, the difficulty of design and deployment also increase. Another problem is that the IT system designer needs to consider numerous restrictions such as physical space (server rack, data center), power consumption, and the like, and must take into account the interoperability among the many hardware devices. Cabling between hardware devices has also become a problem when the IT platform system is increasingly huge.

Many IT platform systems are encountering the problems of network resource constraint, especially between the server machine and the storage subsystem. Typically, the server machine and the storage subsystem connect to each other by using SAN (FC, iSCSI, FCoE). In this case, many server machines connect to SAN switches, and the storage subsystems also connect to the SAN switches. Recently, however, the Flash storage device has been becoming more popular. The Flash storage device would become an alternative to the hard disk drive because of high performance. Utilizing Flash storage device will require more networking resources between the server machine and the storage subsystem. The SAN switches tend to become the bottleneck, and to avoid the bottleneck would require many SAN switches and HBAs (Host Bus Adapters).

BRIEF SUMMARY OF THE INVENTION

Exemplary embodiments of the invention provide a method of storage array with frame forwarding capability to reduce the complexity of an IT platform system having a large number of hardware devices. The frame forwarding capability enables the IT platform system in reducing the hardware device, cabling, design, and deployment complexity. To overcome the problems associated with consolidated networking switch devices such as I/O bottleneck, the storage subsystem provides logical volumes (LU) to read/write data for server machines which are connected to the storage subsystem directly, and also provides packet/frame forwarding capability among connected server machines and other network switches. In this way, the information system provides more physical space to install server machines and storage, more I/O resources between server and storage subsystem, less complexity of design and deployment, and simplified cabling.

In one embodiment, the storage subsystem provides logical volumes (LU) to read/write data for server machines, and also provides packet/frame forwarding capability among connected server machines and other network switches. The storage subsystem has a storage controller, a frame forwarder, a network controller, and a device unit which are connected by an internal bus. The storage controller has a CPU and a RAM to control SCSI I/O in order to provide logical volumes to the server machines. Each logical volume is composed by using storage devices which are located on the device unit. The frame forwarder has a CPU and a RAM, and connects to the network controller which connects to the server machine directly. The frame forwarder receives a packet/frame from the server machine and forwards it to another server machine or another frame forwarder within the storage subsystem. If the frame forwarder receives a packet/frame with a destination address for the storage controller within the storage subsystem, the frame forwarder sends the packet/frame to the storage controller.

In another embodiment, the storage subsystem provides logical volumes (LU) to read/write data for server machines, and also provides packet/frame forwarding capability among connected server machines and other network switches. The storage subsystem has a storage controller, a frame forwarder, a network controller, and a device unit which are connected by an internal bus. The storage controller has a CPU and a RAM to control SCSI I/O in order to provide logical volumes to the server machines. Each logical volume is composed by using storage devices which are located on the device unit. The frame forwarder has a CPU and a RAM, and connects to the network controller which connects to the server machine directly. The network controller also has frame forwarder feature. The frame forwarder receives a packet/frame from the server machine and forwards it to another frame forwarder within the storage subsystem. If the frame forwarder receives a packet/frame with a destination address for storage controller within storage subsystem, the frame forwarder sends the packet/frame to storage controller.

In accordance with an aspect of the present invention, a storage system comprises one or more storage devices; a storage controller having a storage controller processor and a storage controller memory and being coupled with the one or more storage devices; an interface controller receiving an I/O (input/output) command directly from a host computer; and an internal bus. The interface controller and the storage controller are coupled by the internal bus.

In some embodiments, the interface controller includes a network interface controller, a memory, and a processor. The network interface controller provides virtual Ethernet bridging. The interface controller determines whether the received I/O command is targeted to an address within the storage system or not. If the interface controller determines that the received I/O command is not targeted to an address within the storage system, the interface controller transfers the received I/O command to a switch outside of the storage system.

In specific embodiments, the received I/O command includes one or more frames. The interface controller includes one or more network interface controllers and a frame forwarder coupled to the one or more network interface controllers. The frame forwarder includes a frame forwarder memory and a frame forwarder processor configured to forward frames. The interface controller includes a plurality of network interface controllers and each of the network interface controllers receives an I/O command directly from a corresponding host outside the storage system.

In some embodiments, the received I/O command includes one or more frames. The interface controller includes one or more network interface controllers each having a frame forwarder. The frame forwarder includes a frame forwarder memory and a frame forwarder processor configured to forward frames.

In specific embodiments, the received I/O command includes one or more frames. The storage system further comprises a frame forwarder which is coupled to the internal bus and includes a frame forwarder memory and a frame forwarder processor configured to forward frames.

In accordance with another aspect of the invention, a storage system comprises one or more storage devices; a storage controller having a processor and a memory and being coupled with the one or more storage devices; and a network interface controller which provides virtual Ethernet bridging.

In some embodiments, the network interface controller and the storage controller are coupled by an internal bus. The network interface controller receives an I/O (input/output) command directly from a host computer. The received I/O command includes one or more frames. The network interface controller includes a frame forwarder. The frame forwarder includes a frame forwarder memory and a frame forwarder processor configured to forward frames.

In specific embodiments, the received I/O command includes one or more frames, and the storage system further comprises a frame forwarder which includes a frame forwarder memory and a frame forwarder processor configured to forward frames and an internal bus. The network interface controller, the storage controller, and the frame forwarder are coupled by the internal bus.

In accordance with another aspect of this invention, a storage system comprises one or more storage devices; a storage controller having a storage controller processor and a storage controller memory and being coupled with the one or more storage devices; and an interface controller receiving an I/O (input/output) command directly from a host computer. The interface controller determines whether the received I/O command is targeted to an address within the storage system or not. If the interface controller determines that the received I/O command is not targeted to an address within the storage system, the interface controller transfers the received I/O command to a switch outside of the storage system.

In some embodiments, the received I/O command includes one or more frames. The interface controller includes one or more network interface controllers and a frame forwarder coupled to the one or more network interface controllers. The frame forwarder includes a frame forwarder memory and a frame forwarder processor configured to forward frames. The interface controller includes a plurality of network interface controllers and each of the network interface controllers receives an I/O command directly from a corresponding host outside the storage system.

In specific embodiments, the received I/O command includes one or more frames. The interface controller includes one or more network interface controllers each having a frame forwarder. The frame forwarder includes a frame forwarder memory and a frame forwarder processor configured to forward frames.

These and other features and advantages of the present invention will become apparent to those of ordinary skill in the art in view of the following detailed description of the specific embodiments.

BRIEF DESCRIPTION OF THE DRAWINGS

FIG. 1 illustrates an example of a hardware configuration of an information system in which the method and apparatus of the invention may be applied.

FIG. 2 shows an example of the software configuration of the RAM in the storage controller.

FIG. 3 shows an example of the software configuration of the RAM in the frame forwarder.

FIG. 4 shows an example of the configuration of the host.

FIG. 5a shows an example of the packet/frame format for storage I/O using FCoE.

FIG. 5b shows an example of the packet/frame format for storage I/O using FCoE over PCI express.

FIGS. 6a, 6b, and 6c show examples of the forwarding tables of the frame forwarders.

FIG. 7 shows an example of the mapping table of the storage controller.

FIG. 8 shows an example of a flow diagram of switching control by the frame forwarder.

FIG. 9a shows an example of the packet/frame format for host I/O using Ethernet.

FIG. 9b shows an example of the packet/frame format for storage I/O using FCoE over PCI express.

FIG. 10 illustrates another example of a hardware configuration of an information system in which the method and apparatus of the invention may be applied.

FIG. 11 shows examples of VLAN table in the RAM of FIG. 3 for managing one or more subnets.

FIG. 12 shows an example of a multicast frame to be forwarded from one network controller to another network controller.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for storage array with frame forwarding capability to reduce the complexity of an IT platform system having a large number of hardware devices.

System Configuration

FIG. 1 illustrates an example of a hardware configuration of an information system in which the method and apparatus of the invention may be applied. The information system includes a storage subsystem 100 and a plurality of hosts 200.

The storage subsystem 100 includes a storage controller 110, a device unit 120, interface controllers 130 (130*a*, 130*b*) with frame forwarders 140 (140*a*, 140*b*), a frame forwarder 140*c*, and an internal bus 150. The storage controller 110 has a CPU and a RAM. The frame forwarder 140 has a CPU and a RAM.

FIG. 2 shows an example of the software configuration of the RAM 112 in the storage controller 110. The RAM 112 has operating system 112-01; RAID (Redundant Array of Independent Disks) control 112-02 to configure RAID group by using one or more storage devices in the device unit 120; logical volume control 112-03 to provide logical unit (LU) from the RAID group; IO control 112-04 to handle read/write IO by using SCSI, iSCSI, FC, FCoE and so on; and mapping table 112-05 to manage the relationship between network address and SCSI target address. The interface controller 130 has the frame forwarder 140 and one or more network controllers (NC1, NC2, NC3).

FIG. 3 shows an example of the software configuration of the RAM 142 in the frame forwarder 140. The RAM 142 has operating system 142-01; and switching control 142-02 to receive and send packet/frame to the network controllers and internal bus 150 according to forwarding table 142-03 and virtual network controller mapping table or VLAN (Virtual Local Area Network) table 142-04. The network controllers on the interface controller 140 are each the physical interface (port) to connect to the host 200 directly. Each component is connected via the internal bus 150 such as PCI, PCI express, crossbar switch and so on.

FIG. 11 shows examples of VLAN table 142-04 in the RAM of FIG. 3 for managing one or more subnets. In the first example, the VLAN table 142-04*a* has VLAN IDs 100, 100, and 200 and corresponding network controllers NC1, NC2, and NC3, respectively. In the second example, the VLAN table 142-04*b* has VLAN IDs 100, 200, and 200 and corresponding network controllers NC1, NC2, and NC3, respectively. The storage subsystem 100 can handle one or more subnets using the VLAN table 142-04 stored in the RAM 142 of each frame forwarder 140.

FIG. 4 shows an example of the configuration of the host 200. The host 200 includes a CPU, a RAM, and a network controller (NC) to connect to the network controller on the storage subsystem 100 directly. The RAM 202 of the host 200 has operation system 202-01 and network driver 202-02 to control network I/O such as Ethernet, Infiniband, and PCI express.

Storage I/O

The storage controller 110 in the storage subsystem 100 provides logical volumes (LUs) to the connected hosts 200. A host 200 issues a read/write SCSI I/O command to the logical volumes. At first, a network controller on the storage subsystem 100 receives the SCSI I/O command which is encapsulated and divided into one or more packets/frames by using a lower layer protocol such as iSCSI, FCoE (Ethernet), Infiniband, and PCI express. Each packet/frame is transferred to a frame forwarder 140, and the frame forwarder 140 analyzes the packet/frame header to determine the destination of the packet/frame to forward. Each packet/frame has a destination address such as MAC address for FCoE, Ethernet; IP address for iSCSI, NFS/CIFS, other TCP/IP connection; GUID (Global Unique ID) and GID (Global ID) for Infiniband; and routing ID (bus, device function number) for PCI express. These networking protocols can be also used at the same time. Examples include iSCSI over Infiniband, FCoE over PCI express and so on.

FIG. 5*a* shows an example of the packet/frame format for storage I/O using FCoE. It includes destination address, source address, type, data, and frame check sequence. In this case, the host 200*a* sends an Ethernet frame which includes SCSI I/O command to the storage subsystem 100. The destination address is "Addr110," and the FCoE frame is transferred to the storage controller 110 according to the forwarding table 142-03*a*.

FIG. 5*b* shows an example of the packet/frame format for storage I/O using FCoE over PCI express. It includes framing (start), sequence number, header, data, digest, LCRC (Length Cyclic Redundancy Check), and framing (end). The header includes the destination address. The host 200 sends a PCI express frame (TLP) which includes SCSI I/O commands (FCoE frame) to the storage subsystem 100. The destination address is 00:03:11 (bus/dev/fn ID of the storage controller 110), and the PCI express frame (TLP) is transferred to the storage controller 110 according to the forwarding table 142-03*a*.

FIGS. 6*a*, 6*b*, and 6*c* show examples of the forwarding tables 142-03*a*, 142-03*b*, 142-03*c* of the frame forwarders 140*a*, 140*b*, 140*c*. Each forwarding table has the "Address" column, the "Forward to" column, and the "Device Addr" column.

In order to forward SCSI I/O to the storage controller 110, the frame forwarder 140 needs to know the network address of the storage controller 110. When the frame forwarder 140 receives the packet/frame, it analyzes the destination address of the packet/frame, refers to the forwarding table 142-03, and then sends the packet/frame to the proper component such as a network controller, another frame forwarder 140, or the storage controller 110 via the internal bus 150. The internal bus address can be found in the "Device Addr" column of the forwarding table. The frame forwarder 140, network controller, and storage controller 110 are connected by the internal bus 150 such as PCI express, so that each packet/frame can be delivered by using the internal bus network (see FIG. 8).

FIG. 7 shows an example of the mapping table 112-05 of the storage controller 110. It manages the network address of the storage controller 110 by itself using MAC address (Address column), the corresponding IP address which can be defined to allow iSCSI/NAS access (IP_Address column), the SCSI target name which is reachable by using the network address (SCSI Target Name column), and the volume ID (VOL ID column). All packets and frames with the destination address "Addr110" will be forwarded to the storage controller 110, and then the storage controller 110 can de-capsulate the packets/frames and proceed with SCSI layer I/O processing.

In one example, the storage subsystem 100 receives an ARP (Address Resolution Protocol) request with an ARP request packet addressed to network controllers that have the same VLAN ID (broadcast). When a network controller having the same VLAN ID gets the ARP request packet (broadcast packet), if the storage controller 110 has the requested IP address contained in the packet, the network controller sends an ARP reply packet with the MAC address of the storage controller 110. If the storage controller 110 does not have the requested IP address, the network controller forwards the ARP request broadcast packet to another network controller that has the same VLAN ID and the procedure is repeated by that network controller. When a network controller forwards the ARP request broadcast packet to another network controller having the same VLAN ID, it forwards a multicast frame to that network controller which has the same multicast IP address (MAC address).

FIG. 12 shows an example of a multicast frame to be forwarded from one network controller to another network controller which has the same multicast IP address (MAC address) as the network controller sending the multicast frame. The multicast frame has fields predefined to indicate that it is a multicast frame and fields that store the multicast address generated by the IP layer.

On the other hand, in order to forward SCSI I/O from the storage controller 110 to the host 200, the frame forwarder 140 needs to know the network address of the host 200. At first, the storage controller 110 encapsulates SCSI I/O data from the logical volume control 112-03 into the storage I/O protocol such as Ethernet (FCoE) and TCP/IP(iSCSI), and re-encapsulates the storage I/O protocol packets/frames into PCI express (the protocol for the internal bus 150), and then forwards them to the frame forwarder 140*c*. The frame forwarder 140*c* has the responsibility to re-forward these packets/frames to the proper end station such as the host 200.

FIG. 8 shows an example of a flow diagram of switching control 142-02 by the frame forwarder 140. In step 142-02-01, the frame forwarder 140 receives a packet/frame from the internal bus 150. In step 142-02-02, the frame forwarder 140 de-capsulates the PCI express frame (TLP) to get the payload (Ethernet frame). In step 142-02-03, the frame forwarder 140 gets the destination address from the Ethernet header. In step 142-02-04, the frame forwarder 140 refers to the forwarding table 142-03, and gets the device address to forward the frame. In step 142-02-05, the frame forwarder 140 encapsulates the Ethernet frame into a PCI express frame (TLP) with the device address routing ID. In step 142-02-06, the frame forwarder 140 forwards the PCI express frame (TLP) to the component according to the device address.

Host I/O

The frame forwarder 140 in the storage subsystem 100 provides the packet/frame switching feature between hardware devices which are connected to the storage subsystem 100. A hardware device such as the host 200 sends Ethernet, Infiniband, or PCI (express) packet/frame to the frame forwarder 140 in the storage subsystem 100 to communicate with the other hardware devices. At first, the network controller on the storage subsystem 100 receives the Ethernet, Infiniband, or PCI (express) packet/frame. Each packet/frame is transferred to the frame forwarder 140, and the frame forwarder 140 analyzes the packet/frame header to determine the destination of the packet/frame to forward. Each packet/frame has a destination address such as MAC address for Ethernet; IP address; GUID (Global Unique ID) and GID (Global ID) for Infiniband; and routing ID (bus, device function number) for PCI express. These networking protocols can be also used at the same time. Examples include IP over Infiniband, Ethernet over PCI express and so on.

FIG. 9*a* shows an example of the packet/frame format for host I/O using Ethernet. It includes destination address, source address, type, data, and frame check sequence. In this case, the host 200*a* sends an Ethernet frame which includes a TCP/IP packet to the storage subsystem 100. The destination address is Addr200*d*, and the Ethernet frame is transferred to the frame forwarder 140*b* which has the access route to the final destination (host 200*d*) according to the forwarding table 142-03*a*.

FIG. 9*b* shows an example of the packet/frame format for storage I/O using FCoE over PCI express. It includes framing (start), sequence number, header data, digest LCRC, and framing (end). The header includes the destination address. The host 200 sends the PCI express frame (TLP) which includes SCSI I/O commands (FCoE frame) to the storage subsystem 100. The destination address is 00:02:14 (bus/dev/fn ID of the frame forwarder 140*b)*, so that the PCI express frame (TLP) is transferred to the frame forwarder 140*b* which has the access route to the final destination (host 200d) according to the forwarding table 142-03a.

In order to forward the Ethernet, Infiniband, or PCI (express) packet/frame, the frame forwarder 140 needs to know the network address of each end point such as the host 200. When the frame forwarder 140 receives a packet/frame, it analyzes the destination address of the packet/frame, refers to the forwarding table 142-03 (see FIG. 6), and then sends the packet/frame to the proper component such as a network controller which connects to another hardware device such as host 200, or another frame forwarder 140 via the internal bus 150. The internal bus address can be found in the "Device Addr" column of the forwarding table 142-03. The frame forwarder 140 and network controller are connected by the internal bus 150 such as PCI express, so that each packet/frame can be delivered by using the internal bus network.

Frame Forwarder on Network Controller

FIG. 10 illustrates another example of a hardware configuration of an information system in which the method and apparatus of the invention may be applied. In this case, each network controller in the storage subsystem 100 has its own frame forwarder 140 feature. When the frame forwarder 140 on a network controller receives a packet/frame, it analyzes the destination address of the packet/frame, refers to the forwarding table 142-03, and then sends the packet/frame to the proper component such as another frame forwarder 140 on another network controller or the storage controller 110 via the internal bus 150.

In specific embodiments, the network interface controller provides virtual Ethernet bridging (VEB). Virtualization intermediaries (VIs) are used to safely share I/O, so that one or more operating systems can share the PCI device through the VI. The VI performs Ethernet sharing functions, which includes providing a communication mechanism between operating systems running above the same hypervisor. Native I/O virtualization (IOV) is based on VIs and uses a direct sharing mechanism in the PCI (express) to enable hypervisor bypass. For Ethernet, this additional native IOV mechanism is provided to cover the virtual Ethernet bridging used to communicate between operating systems running above the same hypervisor. The use of VEB can significantly improve performance of the network interface controller. See, e.g., Mike Ko & Renato Recio, "Virtual Ethernet Bridging," IBM, http://www.ieee802.org/1/files/public/docs2008/new-dcb-ko-VEB-0708.pdf; and Ilango Ganga et al., "Virtual Ethernet Bridging in Server End Stations," IEEE 802.1 interim meeting, September 2008, Seoul, Korea. These references are incorporated herein by reference.

Of course, the system configurations illustrated in FIGS. 1 and 10 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for storage array with frame forwarding capability. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
one or more storage devices;
a storage controller having a storage controller processor and a storage controller memory and being coupled with the one or more storage devices;
an interface controller receiving an I/O (input/output) frame directly from a host computer; and
an internal bus;
wherein the interface controller and the storage controller are coupled by the internal bus; and
wherein the interface controller includes a frame forwarder to perform at least one of forwarding the I/O frame among external host computers which are connected with the interface controller or forwarding the frame between the storage controller and one or more external host computers connected with the interface controller.

2. The storage system according to claim 1,
wherein the frame forwarder is configured to forward the frame to another interface controller in the storage system.

3. The storage system according to claim 1,
wherein the frame forwarder is configured to forward the frame to an external switch device which connects one or more external host computers.

4. The storage system according to claim 1,
wherein the frame forwarder has address information of the storage controller and the external host computers for I/O frame forwarding.

5. The storage system according to claim 1, further comprising:
another frame forwarder configured to forward the frame and coupled to the internal bus which is coupled to the interface controller and the storage controller.

6. The storage system according to claim 1,
wherein the frame forwarder is configured to handle Ethernet frame including at least one of VLAN ID or multicast ID.

7. The storage system according to claim 6,
wherein the Ethernet frame coming from or going to the storage controller is handled as storage I/O.

8. The storage system according to claim 1,
wherein the interface controller includes a network interface controller that provides virtual Ethernet bridging.

9. The storage system according to claim 1,
wherein the frame forwarder determines whether the received I/O frame is targeted to an address within the storage system or not; and
wherein if the frame forwarder determines that the received I/O frame is not targeted to an address within the storage system, the frame forwarder transfers the received I/O frame to a switch outside of the storage system.

10. The storage system according to claim 1,
wherein the interface controller includes one or more network interface controllers each having a frame forwarder.

11. A storage system comprising:
one or more storage devices;
a storage controller having a storage controller processor and a storage controller memory and being coupled with the one or more storage devices;
an interface controller receiving an I/O (input/output) frame directly from a host computer;
a frame forwarder; and
an internal bus;
wherein the interface controller, the storage controller, and the frame forwarder are coupled by the internal bus; and
wherein the frame forwarder performs at least one of forwarding the frame among external host computers which are connected with the interface controller or forwarding the frame between the storage controller and one or more external host computers connected with the interface controller.

12. The storage system according to claim 11,
wherein the frame forwarder is configured to forward the frame to an external switch device which connects one or more external host computers.

13. The storage system according to claim 11,
wherein the frame forwarder has address information of the storage controller and the external host computers for I/O frame forwarding.

14. The storage system according to claim 11,
wherein the frame forwarder is configured to handle Ethernet frame including at least one of VLAN ID or multicast ID.

15. The storage system according to claim 14,
wherein the Ethernet frame coming from or going to the storage controller is handled as storage I/O.

16. A storage system comprising:
one or more storage devices;
a storage controller having a storage controller processor and a storage controller memory and being coupled with the one or more storage devices; and
an interface controller receiving an I/O (input/output) frame directly from a host computer;
wherein the interface controller includes a frame forwarder to perform at least one of forwarding the frame among external host computers which are connected with the interface controller or forwarding the frame between the storage controller and one or more external host computers connected with the interface controller;
wherein the frame forwarder determines whether the received I/O frame is targeted to an address within the storage system or not; and
wherein if the frame forwarder determines that the received I/O frame is not targeted to an address within the storage system, the frame forwarder transfers the received I/O frame to a switch outside of the storage system.

17. The storage system according to claim 16,
wherein the frame forwarder is configured to perform at least one of forwarding the frame to another interface controller in the storage system, or forwarding the frame to an external switch device which connects one or more external host computers.

18. The storage system according to claim 16,
wherein the frame forwarder has address information of the storage controller and the external host computers for I/O frame forwarding.

19. The storage system according to claim 16, further comprising:
another frame forwarder configured to forward the frame and coupled to the internal bus which is coupled to the interface controller and the storage controller.

20. The storage system according to claim 16,
wherein the interface controller includes one or more network interface controllers each having a frame forwarder.

* * * * *